(12) United States Patent
Ngningha, Jr. et al.

(10) Patent No.: US 11,585,385 B2
(45) Date of Patent: Feb. 21, 2023

(54) SENSOR BEARING UNIT AND ASSOCIATED APPARATUS AND MANUFACTURING METHOD

(71) Applicant: Aktiebolaget SKF, Gothenburg (SE)

(72) Inventors: Gilles Ngningha, Jr., Tours bat C (FR); Eric Robert, Saint Cyr sur Loire (FR); Vincent Sausset, Azay-le-Rideau (FR); Charlotte Vu, Parçay Meslay (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/405,135

(22) Filed: Aug. 18, 2021

(65) Prior Publication Data

US 2022/0099145 A1 Mar. 31, 2022

(30) Foreign Application Priority Data

Sep. 28, 2020 (DE) .......................... 102020125224.2

(51) Int. Cl.
| | |
|---|---|
| *F16C 19/06* | (2006.01) |
| *F16C 41/00* | (2006.01) |
| *G01P 3/44* | (2006.01) |
| *G01P 3/487* | (2006.01) |

(52) U.S. Cl.
CPC ............ *F16C 41/007* (2013.01); *F16C 19/06* (2013.01); *G01P 3/443* (2013.01); *G01P 3/487* (2013.01)

(58) Field of Classification Search
CPC ...... F16C 19/06; F16C 33/586; F16C 41/007; F16C 2226/76; F16C 2226/80; G01P 3/443; G01P 3/487
See application file for complete search history.

(56) References Cited

U.S. PATENT DOCUMENTS

| | | | |
|---|---|---|---|
| 10,132,359 B2 | 11/2018 | Chaussat et al. | |
| 2006/0170414 A1* | 8/2006 | Vignotto | ................. G01P 3/443 324/174 |
| 2018/0128320 A1* | 5/2018 | Chaussat | .................. G01D 5/12 |

FOREIGN PATENT DOCUMENTS

| | | | |
|---|---|---|---|
| FR | 2898949 A1 * | 9/2007 | ............ F16C 41/007 |
| FR | 3052202 B1 | 11/2018 | |

* cited by examiner

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

The sensor bearing unit provides a bearing having an inner ring and an outer ring centered on an axis, the inner ring mounted on a shaft, and an impulse ring provided with a target holder and with a target mounted on the target holder, the target holder being secured to the inner ring. The target holder includes anti-rotation features adapted to cooperate with complementary anti-rotation features of the shaft so as to prevent angular movement of the impulse ring relative to the shaft by abutment in circumferential direction.

10 Claims, 4 Drawing Sheets

SENSOR BEARING UNIT AND ASSOCIATED APPARATUS AND MANUFACTURING METHOD

CROSS-REFERENCE TO RELATED APPLICATIONS

This application claims priority to German Patent Application no. 102020125224.2, filed Sep. 28, 2020, the contents of which is fully incorporated herein by reference.

TECHNICAL FIELD OF THE INVENTION

The present invention relates to a sensor bearing unit comprising a bearing and an impulse magnetic ring.

BACKGROUND OF THE INVENTION

Today, sensor bearing units are commonly used in a wide range of technical fields, for example in automotive industry and aeronautics. These units provide high quality signals and transmissions, while allowing integration in simpler and more compact apparatus.

Such a sensor bearing unit generally comprises a bearing, an impulse ring, and detection means facing the impulse ring. For example, the impulse ring is provided with a target holder and with a magnetized target fixed to the target holder beyond the outer ring of the bearing.

The magnetic target includes alternating North and South poles, whose number depends on bearing size, detection precision and particular application. The detection means may be fixed to the outer ring of the bearing or to a fixed casing.

In a first type of impulse ring, the target holder comprises a flange provided with an outer tubular portion onto which the magnetic target is attached, and with an inner tubular portion secured into an annular groove made in the bore of the inner ring in order to prevent the rotation of the impulse ring relative to the inner ring. To this end, the flange is radially crimped into the annular groove of the inner ring.

In a second type of impulse ring, the target holder of the impulse ring is also provided with a fixing sleeve supporting the flange and secured to the inner ring. The sleeve comprises an annular axial portion and a radial collar extending radially outwards the axial portion, the flange being axially mounted between the inner ring of the bearing and the radial collar of the sleeve. For more details, it is possible for example to refer to U.S. Pat. No. 10,132,359.

Similarly, to the first type of impulse ring, the axial portion of the sleeve is secured into the annular groove of the inner ring in order to prevent the rotation of the impulse ring relative to the inner ring.

It is essential that the impulse ring is fixedly connected in rotation with the bearing inner ring to which it is attached.

In some cases, due to high speeds, thermal dilatation or high mechanical loads, there is a significant risk that the angular mechanic connection between the impulse ring and the inner ring holding it becomes partially or totally loose, permanently, or randomly. Should such a failure occur, the signal measured by the detection means would not correspond to the real position or speed or acceleration of the inner ring of the bearing with respect to the outer ring.

One aim of the present invention is to provide a sensor bearing unit with improved angular connection between the impulse ring and the associated bearing inner ring.

The invention relates to a sensor bearing unit comprising a bearing provided with an inner ring and with an outer ring centered on an axis, the inner ring being intended to be mounted on a shaft.

The sensor bearing unit also comprises an impulse ring provided with a target holder and with a target mounted on the target holder, the target holder being secured to the inner ring.

According to a general feature, the target holder comprises anti-rotation means adapted to cooperate with complementary anti-rotation means of the shaft so as to prevent angular movement of the impulse ring relative to the shaft by abutment in circumferential direction.

Accordingly, both the anti-rotation means of the target holder and the complementary anti-rotation means of the shaft extend in the circumferential direction over a limited angular sector. In other words, the anti-rotation means of the target holder and the shaft are not annular.

The anti-rotation means of the target holder may extend into the complementary anti-rotation means of the shaft or vice versa.

According to a first design, the anti-rotation means of the target holder of the impulse ring are at least partly offset radially inwards with respect to the bore of the inner ring of the bearing to be adapted to protrude into the complementary anti-rotation means of the shaft. The anti-rotation means of the target holder may protrude radially inwards with respect to the bore of the inner ring of the bearing.

In one embodiment, the anti-rotation means of the target holder of the impulse ring comprise at least one lug adapted to extend into one groove formed on the shaft.

According to a second design, the anti-rotation means of the target holder comprise at least one anti-rotation recessed portion adapted to receive the complementary anti-rotation means of the shaft. In this case, the complementary anti-rotation means of the shaft may protrude radially outwards with respect to the outer surface of the shaft. The complementary anti-rotation means of the shaft may protrude radially outwards with respect to the bore of the inner ring of the bearing.

The target holder of the impulse ring may comprise at least a flange axially mounted against a lateral face of the inner ring of the bearing, the magnetic target being mounted on the flange.

Preferably, the flange comprise the anti-rotation means. The flange may comprise a radial portion axially mounted against the lateral face of the inner ring the anti-rotation means extending from the radial portion.

In one embodiment, the target holder further comprises a sleeve secured to the inner ring of the bearing, the flange being axially mounted between the lateral face of the inner ring and the sleeve. In this embodiment, the sleeve forms a fixing portion of the target holder. The radial portion of the flange may be axially mounted between the lateral face of the inner ring and the sleeve. Preferably, the sleeve comprises at least one through-opening into which extend the anti-rotation means of the flange.

In another embodiment, the target holder only comprises the flange. In such embodiment, an inner portion of the flange may form a fixing portion of the target holder.

The invention also relates to an apparatus comprising a rotating shaft, detection means and a sensor bearing unit as previously defined, wherein the inner ring of the bearing is fixed on the rotating shaft, and the detection means cooperate with the target of the impulse ring for tracking the rotation of the shaft.

The invention further relates to a method for manufacturing a sensor bearing unit as previously defined, wherein the target holder of the impulse ring is secured to the inner ring of the bearing only by axial press-fitting.

BRIEF DESCRIPTION OF THE DRAWINGS

The present invention and its advantages will be better understood by studying the detailed description of specific embodiments given by way of a non-limiting examples and illustrated by the appended drawings on which.

DETAILED DESCRIPTION OF THE INVENTION

Figure 1:
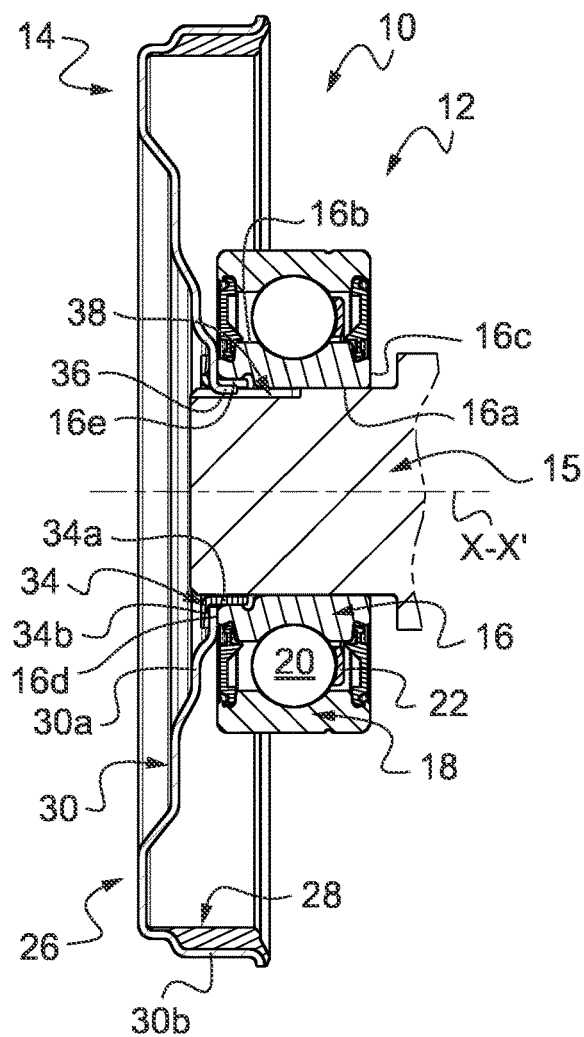
FIG. 1 is an axial section view of a sensor bearing unit according to a first example of the invention mounted on a shaft which does not form part of the unit.

The sensor bearing unit 10 represented on FIG. 1 is adapted to equip an apparatus such as a motor, a brake system, a suspension system or any rotating machine, in particular for an automotive vehicle.

The sensor bearing unit 10 comprises a bearing 12 and an impulse ring 14 mounted on the bearing. The bearing 12 is mounted on a shaft 15 of the apparatus for tracking the rotation of the shaft.

The bearing 12 comprises an inner ring 16 and an outer ring 18. The inner and outer rings 16, 18 are concentric and extend axially along the bearing rotation axis X-X' which runs in an axial direction. The inner and outer rings 16, 18 are made of steel.

In the illustrated example, the bearing 12 also comprises a row of rolling elements 20, which are provided here in the form of balls, interposed between raceways (not referenced) formed on the inner and outer rings 16, 18. The rolling bearing 10 also comprises a cage 22 for maintaining the regular circumferential spacing of the rolling elements 20.

The inner ring 16 of the bearing is mounted on the outer surface of the shaft 15. The inner ring 16 is intended to rotate while the outer ring 18 is intended to be fixed. The outer ring 18 can be mounted in a fixed support member or housing, belonging to the apparatus.

The inner ring 16 comprises a cylindrical inner surface or bore 16a and an outer cylindrical surface 16b which is radially opposite to the bore 16a. A toroidal circular raceway for the rolling elements 20 is formed from the outer cylindrical surface 16b, the raceway being directed radially outwards.

The inner ring 16 also comprises two opposite radial lateral faces 16c, 16d which axially delimit the bore 16a and the outer surface 16b of the ring.

The inner ring 16 further comprises a cylindrical groove 16e made in the bore 16a. The groove 16e is centered on the axis X-X'. Diameter of bore 16a is smaller than diameter of groove 16e. The groove 16e opens on the radial lateral face 16d.

The impulse ring 14 is mounted on the inner ring 16. The impulse ring 14 comprises an annular target holder 26 and a magnetic target 28 mounted on the target holder.

In the illustrated example, the target holder 26 comprises a flange 30 onto which is mounted the magnetic target 28, and a fixing sleeve 34 secured to the inner ring 16. In this example, the sleeve 34 forms a fixing portion of the target holder 26.

The flange 30 is axially secured to the inner ring 16 of the bearing by means of the sleeve 34. The flange 30 is axially mounted between the lateral face 16d of the inner ring and the sleeve 34. The flange 30 is mounted radially around the sleeve 34. The flange 30 is axially interposed and clamped between the lateral face 16d of the inner ring and the sleeve 34. The flange 30 is in axial contact against the lateral face 16d of the inner ring on one side and in axial contact with the sleeve 34 on the other side.

The flange 30 comprises an annular radial portion 30a defining the bore of the flange, and an outer annular axial portion 30b radially surrounding the bearing 12. The outer axial portion 30b is located radially above the outer ring 18 of the bearing. The outer axial portion 30b extends radially a large-diameter edge of the radial portion 30a.

The radial portion 30a of the flange is axially interposed and clamped between the lateral face 16d of the inner ring of the bearing and the sleeve 34. In the illustrated example, the radial portion 30a of the flange is provided with frustoconical parts inclined with respect to the axis X-X' towards the opposite direction of the bearing 12. Frustoconical parts prevent any interference between the flange 30 and the outer ring 18 of the bearing.

As will be described later, the flange 30 also comprise one lug 36 in order to prevent angular movement of the impulse ring 14 relative to the inner ring 16 of the bearing.

In the disclosed example, the flange 30 is made in one part. The flange 30 may be made of metal or plastic, formed by stamping or by any other suitable process.

The sleeve 34 is axially secured to the inner ring 16. The sleeve 34 is mounted into the bore 16a of the inner ring of the bearing. The sleeve 34 is secured into the bore 16a. More precisely, the sleeve 34 is mounted and secured into the groove 16e of the bore. For example, the sleeve 34 may be secured into the bore 16a of the inner ring 16e, by axial press-fitting.

As previously mentioned, the sleeve 34 is axially secured to the inner ring 16. The sleeve 34 may also be angularly secured to the inner ring 16 to fasten in rotation the sleeve and inner ring 16. In this case, the sleeve 34 may be secured into the bore 16a by snapping, by gluing, by welding, by radial crimping or any other appropriate means.

The sleeve 34 comprises an annular axial portion 34a defining the bore of the sleeve, and an outer radial portion or collar 34b extending radially from the axial portion 34a. The collar 34b extends radially outwards from the axial portion 34a. The collar 34b extends an axial end of the axial portion 34a.

The flange 30 is mounted radially around the axial portion 34a of the sleeve. The radial portion 30a of the flange is mounted radially around the axial portion 34a. An annular radial gap (not referenced) subsists between the bore of the flange 30 and the axial portion 34a of the sleeve. The axial portion 34a of the sleeve is secured to the inner ring 16 of the bearing. The axial portion 34a is mounted and secured into the bore 16a of the inner ring of the bearing. More precisely, the axial portion 34a of the sleeve is mounted and secured into the groove 16e of the bore.

The flange 30 is axially interposed and clamped between the lateral face 16d of the inner ring and the radial collar 34b of the sleeve 34. The radial collar 34b axially abuts against the radial portion 30a of the flange.

In the disclosed example, the sleeve 34 is made in one part. The sleeve 34 may be made of metal or plastic, formed by stamping or by any other suitable process.

The magnetic target 28 is mounted on the outer axial portion 30b of the flange. In the disclosed example, the magnetic target 28 is mounted into the bore of the outer axial portion 30b. Alternatively, the magnetic target 28 may be mounted on the outer surface of the outer axial portion 30b.

The magnetic target 28 includes magnetic North and South alternated poles. The magnetic target 28 is multi-polarly magnetized in the circumferentially direction. The magnetic target 28 may be a plastic molded part. The magnetic target 28 may be overmolded onto the flange 30. Alternatively, the magnetic target 28 may be separately formed and secured onto the flange 30 by any appropriate means, for example by bonding or by press-fitting. The magnetic target 28 may be formed of a rubber material with magnetic powder, or of a magnetic alloy or of a plasto-ferrite or of an elasto-ferrite.

Detection means (not shown) are associated with the target 28 for tracking the rotation of the impulse ring 14 and the inner ring 16 around the axis X-X'. The detection means are disposed to radially face the inner surface of the magnetic target 28. For example, the detection means may include Hall-effect sensors.

As previously indicated, the flange 30 comprises one lug 36 in order to form anti-rotations means. The lug 36 extends from the radial portion 30a of the flange towards the inner ring 16 of the bearing. The lug 36 extend axially towards the inner ring 16.

Figure 2:
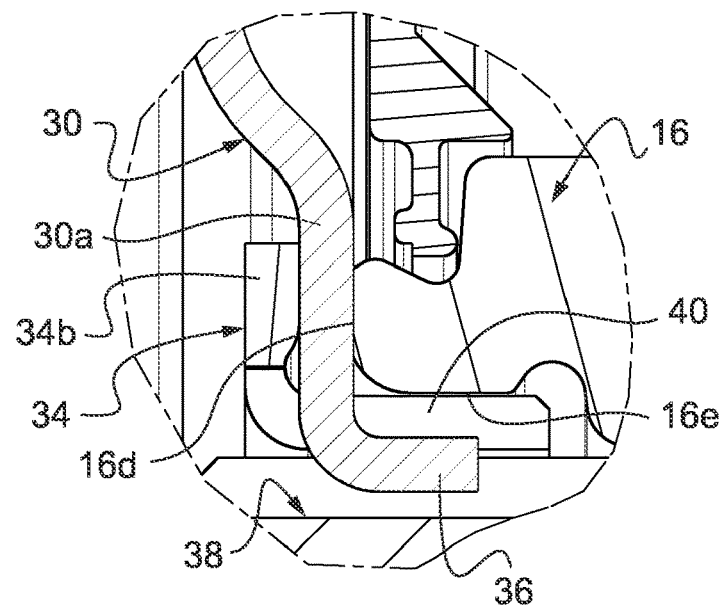
FIG. 2 is a detail view of FIG. 1.
Figure 3:
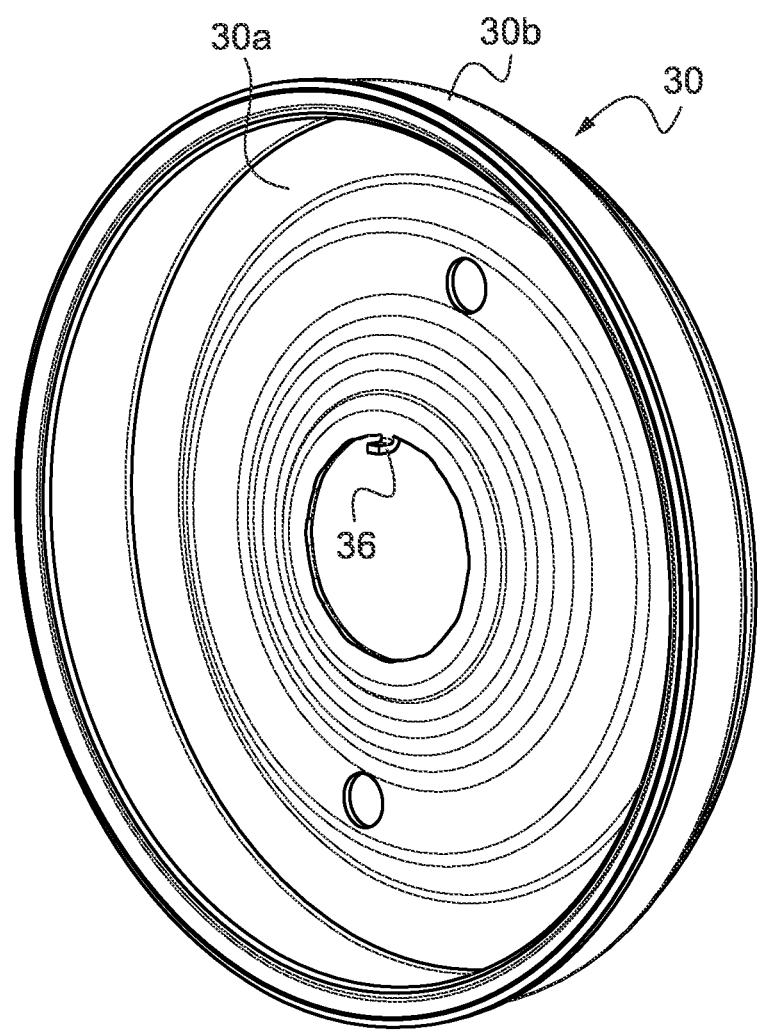
FIG. 3 is a perspective view of the flange of a target holder of an impulse ring of the sensor bearing unit of FIG. 1.
Figure 4:
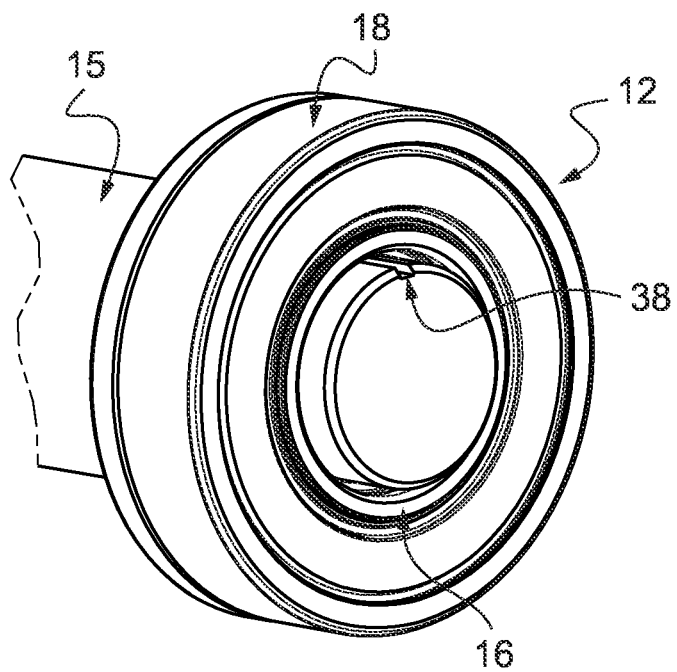
FIG. 4 is a perspective view of the sensor bearing unit of FIG. 1 without the impulse ring and mounted on the shaft.

As shown more clearly on FIG. 2, the lug 36 extends into the bore of the inner ring 16. More precisely, the lug 36 extends into the groove 16e of the bore. The lug 36 remains radially spaced apart from the groove 16e. The lug 36 is offset radially inwards with respect to the groove 16e. The lug 36 is partly offset radially inwards with respect to the bore of the inner ring. The lug 36 protrudes radially inwards with respect to the bore.

The lug 36 extends the inner edge of the radial portion 30a of the flange. The lug 36 is radially offset inwards with respect to the bore of the flange.

In the illustrated example, the flange 30 comprises only one lug 36. Alternatively, the flange 30 may at least two lugs spaced apart from each other in the circumferential direction, preferably regularly.

The lug 36 of the flange protrudes radially into a groove 38 formed on the outer surface of the shaft 15. The lug 36 also extends axially into the groove 38. The groove 38 extends axially on the outer surface of the shaft 15. The groove 38 is oriented radially outwards towards the inner ring 16.

Figure 5:
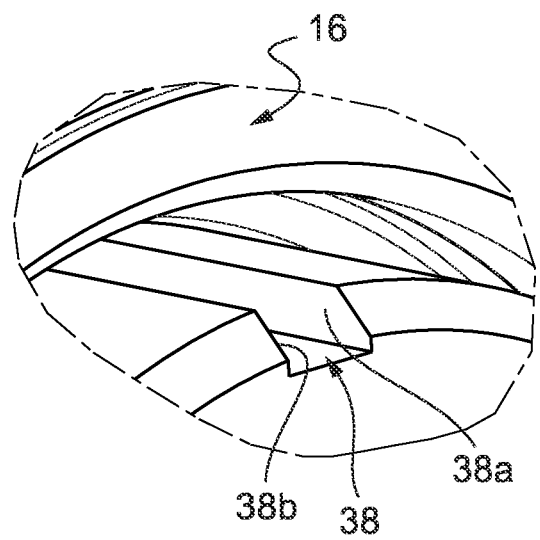
FIG. 5 is a detail view of FIG. 4.

The groove 38 extends in the circumferential direction over a limited angular sector. The circumferential dimension of the groove 38 is substantially equal to the one of the lug 36. The groove 38 is provided with two lateral walls 38a, 38b (FIG. 5) facing each other in the circumferential direction. The lateral walls 38a, 38b delimit the groove in the circumferential direction.

A through-opening 40 is formed in the thickness of the axial portion 34a of the sleeve into which extend the lug 36. The circumferential dimension of the through-opening 40 is slightly larger than the one of the lug 36.

Any relative rotation of the flange 30 of the target holder of the impulse ring relative to the inner ring 16 and the shaft 15 is prevented by the abutment of the lug 36 with the lateral walls 38a, 38b of the groove 38 of the shaft.

The lug 36 of the impulse ring 14 forms local anti-rotation means cooperating by circumferential contact with the groove 38 of the shaft which forms local complementary anti-rotation means.

In the disclosed example, the groove 38 is formed on the outer surface of the shaft 15 on opens on the frontal end face of the shaft. Alternatively, the groove 38 may remain axially spaced apart from the frontal end face. In this case, the groove has the form of a slot.

Figure 6:
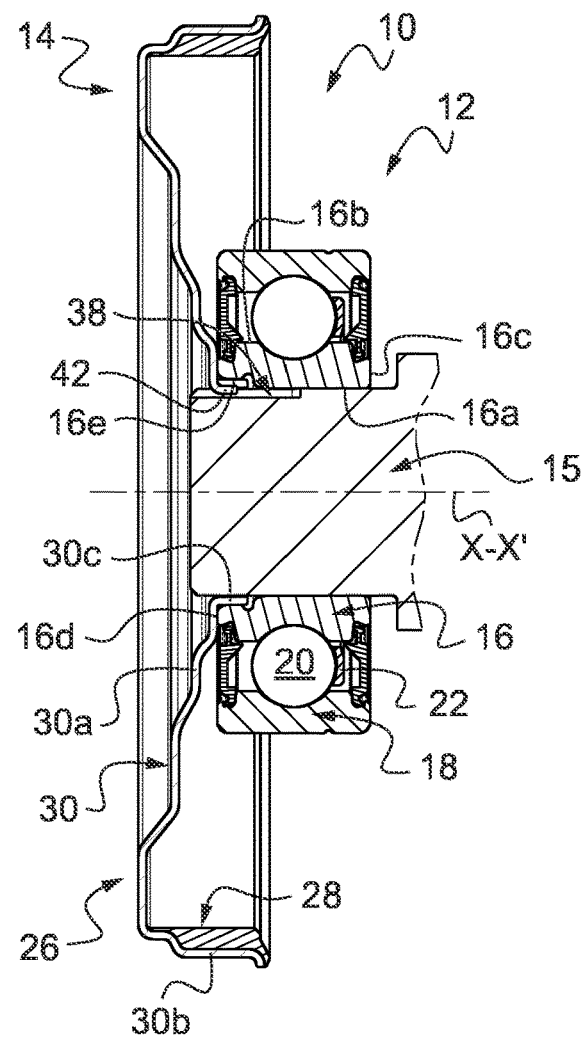
FIG. 6 is an axial section view of a sensor bearing unit according to a second example of the invention mounted on a shaft which does not form part of the unit.
Figure 7:
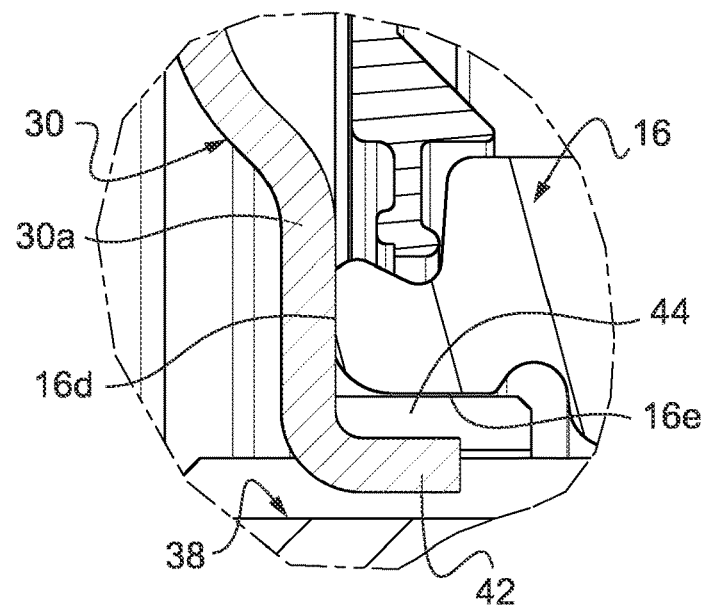
FIG. 7 is a detail view of FIG. 6.

The second example shown on FIGS. 6 and 7, in which identical part are given identical references, mainly differs from the first example in that the target holder 26 only comprises the flange 30.

In this example, the flange 30 of the target holder further comprises an inner axial portion 30c secured to the inner ring 16 and defining the bore of the flange. The flange 30 is axially secured to the inner ring 16 by means of the axial portion 30c. The inner portion 30c is mounted into the bore 16a of the inner ring of the bearing. The inner portion 30c is secured into the bore 16a. More precisely, the inner portion 30c is mounted and secured into the groove 16e of the bore.

The radial portion 30a of the flange extends between the outer and inner axial portions 30b, 30c. The axial portion 30c extends axially inwards the radial portion 30a. The axial portion 30c extends axially a small-diameter edge of the radial portion 30a.

As previously mentioned, the flange 30 is axially secured to the inner ring 16. For example, the inner portion 30c of the flange may be secured into the bore 16a of the inner ring 16e, by axial press-fitting. The inner portion 30c forms a fixing portion of the target holder. Here, the inner portion 30c extends purely axially.

The flange 30 also comprises one lug 42 in order to prevent angular movement of the impulse ring 14 relative to the inner ring 16 of the bearing. The lug 42 extends from the radial portion 30a of the flange towards the inner ring 16 of the bearing. The lug 42 extends the inner edge of the radial portion 30a of the flange. The lug 42 is radially offset inwards with respect to the inner axial portion 30c of the flange. A through-opening 44 is formed in the thickness of the inner axial portion 30c of the flange into which extend the lug 42. The circumferential dimension of the through-opening 44 is slightly larger than the one of the lug 42. Accordingly, the inner axial portion 30c of the flange has not an annular form.

The lug 42 of the flange extends into the bore defining by the inner axial portion 30c. The lug 42 is offset radially inwards with respect to the groove 16e of the inner ring. The lug 42 is partly offset radially inwards with respect to the bore of the inner ring. The lug 42 protrudes radially inwards with respect to the bore. The lug 42 protrudes radially into the groove 38 of the shaft 15. The lug 42 also extends axially into the groove 38. In the illustrated example, the flange 30 comprises only one lug 42. Alternatively, the flange 30 may at least two lugs spaced apart from each other in the circumferential direction.

So far, in the described preferred embodiments of the invention the target 28 is magnetic. In other embodiments of the invention, the target is not magnetic but for instance optical.

In these illustrated examples, the anti-rotation means of the target holder of the impulse ring are formed by the lug 34 or 42 provided on the flange 30.

Alternatively, it could be possible to provide other anti-rotation means, for example at least one boss provided on the flange 30 or the sleeve 34 and protruding radially inwards into an axial groove of complementary shape formed on the outer surface of the shaft 15. As an alternative, it could also be possible to provide the flange 30 or the sleeve 34 with a radial portion axially abutting against the frontal end face of the shaft 15 and provided with at least one boss protruding axially into a radial groove of complementary shape formed on the frontal end face of the shaft. A reversed arrangement of the boss and the axial or radial groove on the flange and the sleeve may also be provided.

Otherwise, in the illustrated examples, the sensor bearing unit is provided with a rolling bearing comprising one row of rolling elements. Alternatively, the rolling bearing may comprise at least two rows of rolling elements. In the illustrated examples, the rolling elements are balls. Alternatively, the rolling bearing may comprise other types of rolling elements, for example rollers. In another variant, the rolling bearing may also be provided with a sliding bearing having no rolling elements.

The invention claimed is:

1. A sensor bearing unit comprising:
   a bearing comprising an inner ring and an outer ring centered on an axis, the inner ring mounted on a shaft, and
   an impulse ring provided with a target holder and with a target mounted on the target holder, the target holder being secured to the inner ring, wherein
   the target holder comprises anti-rotation means adapted to cooperate with complementary anti-rotation means of the shaft so as to prevent angular movement of the impulse ring relative to the shaft by abutment in circumferential direction.

2. The sensor bearing unit according to claim 1, wherein the anti-rotation means of the target holder of the impulse ring are at least partly offset radially inwards with respect to the bore of the inner ring of the bearing to be adapted to protrude into the complementary anti-rotation means of the shaft.

3. The sensor bearing unit according to claim 2, wherein the anti-rotation means of the target holder of the impulse ring comprise at least one lug adapted to extend into one groove formed on the shaft, the one groove forming at least partly the complementary anti-rotation means of the shaft.

4. The sensor bearing unit according to claim 1, wherein the anti-rotation means of the target holder of the impulse ring comprise at least one anti-rotation recessed portion adapted to receive the complementary anti-rotation means of the shaft.

5. The sensor bearing unit according to claim 1, wherein the target holder of the impulse ring comprises at least a flange axially mounted against a lateral face of the inner ring of the bearing, the target being mounted on the flange.

6. The sensor bearing unit according to claim 5, wherein the flange comprises the anti-rotation means.

7. The sensor bearing unit according to claim 5, wherein the flange comprises a radial portion axially mounted against the lateral face of the inner ring, the anti-rotation means extending from the radial portion.

8. The sensor bearing unit according to claim 5, wherein the target holder of the impulse ring further comprises a sleeve secured to the inner ring of the bearing, the flange being axially mounted between the lateral face of the inner ring and the sleeve.

9. An apparatus comprising:
   a rotating shaft,
   detection means, and
   a sensor bearing unit comprising a bearing providing an inner ring and an outer ring centered on an axis, the inner ring mounted on a shaft, and an impulse ring provided with a target holder and with a target mounted on the target holder, the target holder being secured to the inner ring, wherein the target holder comprises anti-rotation means adapted to cooperate with complementary anti-rotation means of the shaft so as to prevent angular movement of the impulse ring relative to the shaft by abutment in circumferential direction, and wherein
   the inner ring of the bearing is fixed on the rotating shaft, and the detection means cooperate with the target of the impulse ring for tracking the rotation of the shaft.

10. A method for manufacturing a sensor bearing unit comprising:
    providing a bearing comprising an inner ring and an outer ring centered on an axis, the inner ring mounted on a shaft, and
    an impulse ring provided with a target holder and with a target mounted on the target holder, the target holder being secured to the inner ring, wherein
    the target holder comprises anti-rotation means adapted to cooperate with complementary anti-rotation means of the shaft so as to prevent angular movement of the impulse ring relative to the shaft by abutment in circumferential direction, wherein
    the target holder of the impulse ring is secured to the inner ring of the bearing only by axial press-fitting.

* * * * *